(12) United States Patent
Clayton et al.

(10) Patent No.: US 6,813,267 B1
(45) Date of Patent: Nov. 2, 2004

(54) TUNABLE BROADCAST/POINT-TO-POINT PACKET ARBITRATION

(75) Inventors: William A. Clayton, Redwood City, CA (US); Lee A. Warner, Redwood City, CA (US); Wayne F. Seltzer, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 795 days.

(21) Appl. No.: 09/658,782

(22) Filed: Sep. 11, 2000

(51) Int. Cl.[7] ............... H04L 12/28; H04L 12/56
(52) U.S. Cl. ............... 370/390; 370/392; 370/400; 370/414
(58) Field of Search ............... 370/390, 392, 370/395, 398, 399, 412–418, 428, 429, 431, 432, 437, 351, 389, 355; 710/316, 317, 327

(56) References Cited

U.S. PATENT DOCUMENTS

| | | | | |
|---|---|---|---|---|
| 4,630,260 A | * | 12/1986 | Toy et al. ............... | 370/355 |
| 4,734,907 A | * | 3/1988 | Turner ............... | 370/390 |
| 5,001,702 A | * | 3/1991 | Teraslinna et al. ............... | 370/392 |
| 5,195,089 A | * | 3/1993 | Sindhu et al. ............... | 370/235 |
| 5,309,433 A | * | 5/1994 | Cidon et al. ............... | 370/390 |
| 5,809,027 A | * | 9/1998 | Kim et al. ............... | 370/451 |
| 5,956,342 A | * | 9/1999 | Manning et al. ............... | 370/414 |
| 6,175,566 B1 | * | 1/2001 | Hahn et al. ............... | 370/390 |
| 6,426,957 B1 | * | 7/2002 | Hauser et al. ............... | 370/413 |
| 6,539,025 B1 | * | 3/2003 | Manning et al. ............... | 370/414 |
| 6,567,885 B1 | * | 5/2003 | Marmash ............... | 710/316 |

* cited by examiner

Primary Examiner—Man Phan
(74) Attorney, Agent, or Firm—Park, Vaughn & Fleming LLP; Edward J. Grundler

(57) ABSTRACT

One embodiment of the present invention provides a system that facilitates packet communication between a device within a computing system and one or more additional devices of the computing system. The system receives either a point-to-point packet or a broadcast packet from the devices and inspects the header of the packet to determine the type of packet. The system also examines the state of the computing system to determine whether the state of the computer system is broadcast preferred or point-to-point only. If the type of the packet is broadcast and the state of the computing system is broadcast preferred, the system sends the packet to all of the additional devices. If the type of the packet is broadcast and the state of the computing system is point-to-point only, the system delays sending the packet until the state of the computing system changes to broadcast preferred. If the type of the packet is point-to-point and the state of the computing system is broadcast preferred, the system delays sending the packet while broadcast packets are available to be sent. Finally, if the type of the packet is point-to-point and the state of the computing system is point-to-point only, the system sends the packet to the addressed device.

20 Claims, 5 Drawing Sheets

TUNABLE BROADCAST/POINT-TO-POINT PACKET ARBITRATION

BACKGROUND

1. Field of the Invention

The present invention relates to transferring data within a computing system. More specifically, the present invention relates to an apparatus and a method that facilitates both broadcast and point-to-point transmissions between components within a computing system.

2. Related Art

Modern computer systems are typically comprised of a number of devices, such as central processing units, memory units, input/output units, and caches. During computer system operation, address and data information must be rapidly transferred between these devices in order to achieve a high level of computer system performance. However, providing dedicated paths for communication between every pair of devices is impractical in sophisticated computer systems with a large number of devices because the number of paths increases quadratically with the number of devices.

A messaging system can be used to provide the necessary communications between devices. In a messaging system, packets are routed from a first device, possibly a central processing unit, through one or more switches to a second device, perhaps a memory. In response, the second device can return a packet to the first device.

In general, there can be two types of packets, point-to-point packets and broadcast packets. Point-to-point packets are used to transfer data between two devices. For example, a point-to-point packet may be used to send a memory request from a central processing unit to a memory unit to retrieve data. In contrast, a broadcast packet is used when all devices need to know the same piece of information, for instance, a message that a cache page has been invalidated.

Multiple point-to-point packets can be sent simultaneously. For instance, device 1 may be sending a packet to device 3, while device 5 is sending a packet to device 2. Since neither of these packets originate or terminate at a common device, the packets will not necessarily interfere with each other. A broadcast packet, however, must be the only packet being sent at a given time.

Interleaving point-to-point packets and broadcast packets can lead to a significant delay when a broadcast packet must be sent. This delay occurs because, before a broadcast packet is sent, the system must wait until all point-to-point packets are complete. In addition, favoring one type of packet over the other type can lead to starvation of the type of packet not being favored.

What is needed is an apparatus and a method for fairly arbitrating between point-to-point packets and broadcast packets in transmitting data between computer system components.

SUMMARY

One embodiment of the present invention provides a system that facilitates communications between a device within a computing system and one or more additional devices of the computing system. The system receives point-to-point packets and broadcast packets from the devices and inspects the headers of these packets to determine the type of a packet. The system also examines the state of the computing system to determine whether the state of the computer system is either broadcast preferred or point-to-point only. If the type of the packet is broadcast and the state of the computing system is broadcast preferred, the system sends the packet to all of the additional devices. If the type of the packet is broadcast and the state of the computing system is point-to-point only, the system delays sending the packet until the state of the computing system changes to broadcast preferred. If the type of the packet is point-to-point and the state of the computing system is broadcast preferred, the system delays sending the packet while broadcast packets are available to be sent. Finally, if the type of the packet is point-to-point and the state of the computing system is point-to-point only, the system sends the packet to the addressed device.

In one embodiment of the present invention, the receiving mechanism includes a plurality of input queues, each input queue being assigned to one of the plurality of additional devices of the computing system.

In one embodiment of the present invention, the system inspects the routing prefix of the packet to determine if the packet is a broadcast packet or a point-to-point packet. If the packet is a point-to-point packet, the system determines a destination for the packet.

In one embodiment of the present invention, the system uses an n-counter to count available packet slots and an m-counter to count broadcast preferred packet slots. The combination of the n-counter and the m-counter determine the state of the computing system. The system uses a broadcast arbiter to issue a broadcast grant to the input queue in response to a broadcast request. The system uses point-to-point arbiters to issue a point-to-point grant to one of the input queues in response to a point-to-point request. Output multiplexers route the packet from the input queue to the selected device, or in the case of a broadcast packet, to all of the devices.

In one embodiment of the present invention, the n-counter is configured to be reset to the number of available packet slots upon receiving an external command or when the n-counter decrements to zero.

In one embodiment of the present invention, the m-counter is configured to be reset to the number of broadcast preferred slots upon receiving an external command or when the n-counter decrements to zero.

In one embodiment of the present invention, upon decrementing to zero, the m-counter is configured to hold at zero waiting for a reset command.

In one embodiment of the present invention, the system sets the state of the computing system to broadcast preferred if both the n-counter and the m-counter are counting. The system sets the state of the computing system to point-to-point only if the n-counter is counting and the m-counter is zero.

In one embodiment of the present invention, the broadcast arbiter receives broadcast requests from the input queues and provides a broadcast grant signal to a requesting input queue based on the state of the computing system and the other grant signals.

In one embodiment of the present invention, the point-to-point arbiter receives point-to-point requests from the plurality of input queues and provides a point-to-point grant signal to the requesting input queue based on the state of the computing system and the other grant signals.

In one embodiment of the present invention, the output multiplexer routes the packet from the selected input queue to the device that is coupled with the output multiplexer.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computing System

Figure 1A:
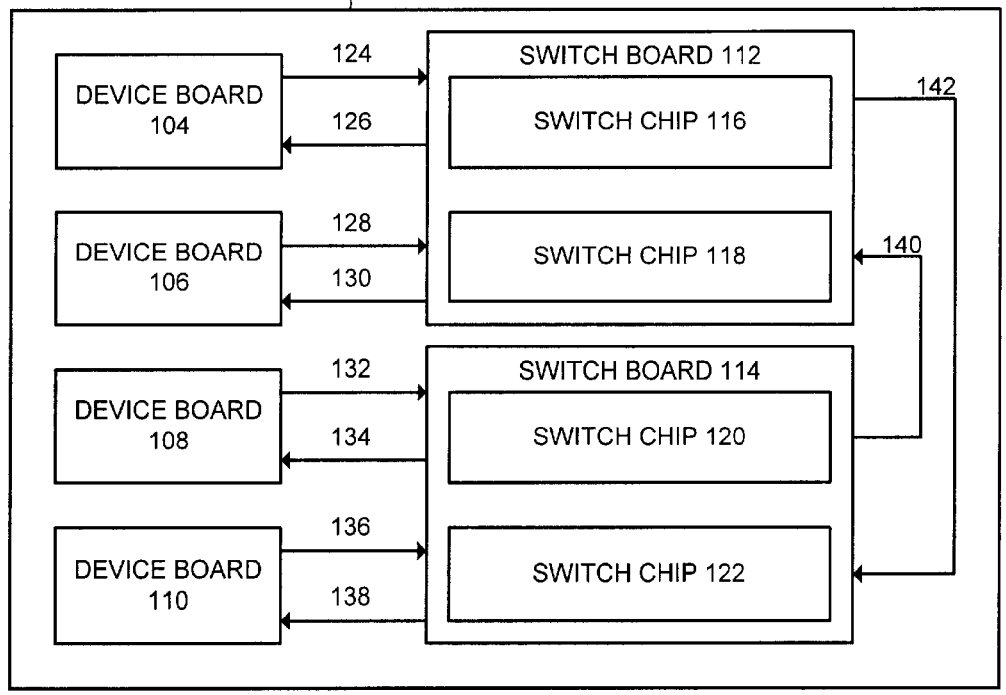
FIG. 1A illustrates a computing system with multiple device boards and multiple switch boards in accordance with an embodiment of the present invention.

FIG. 1A illustrates computing system 102 in accordance with an embodiment of the present invention. Computing system 102 may include any type of computer system, including, but not limited to, a computer system based on a microprocessor, a mainframe computer, a digital signal processor, a personal organizer, a device controller, and a computational engine within an appliance. As illustrated in FIG. 1A, computing system 102 includes device boards 104, 106, 108, and 110, and switch boards 112 and 114. Device boards 104, 106, 108, and 110 are the various devices that comprise computing system 102, such as central processing units, memory devices, input/output devices, and caches. Switch board 112 contains switch chips 116 and 118 and switch board 114 contains switch chips 120 and 122. The various boards communicate through signal lines 124, 126, 128, 130, 132, 134, 136, 138, 140, and 142.

Switch Chip Couplings

Figure 1B:
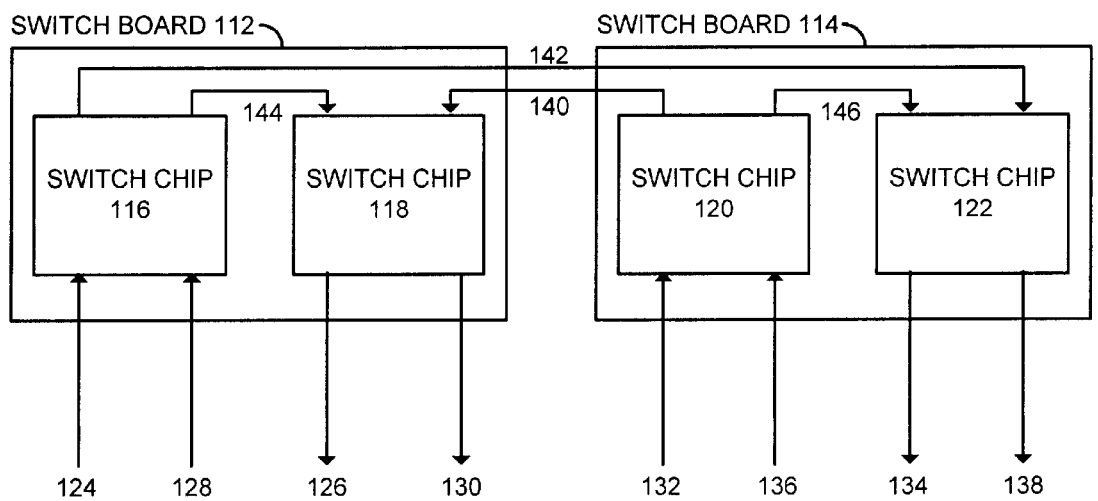
FIG. 1B illustrates how switch chips are interconnected within the computing system in accordance with an embodiment of the present invention.

FIG. 1B illustrates the details of the coupling among the various switch chips in accordance with an embodiment of the present invention. In general, a switch chip has two or more inputs and two or more outputs. Note that although this description relates to switch chips that have two inputs and two outputs, a person skilled in the art will be able to extend the switch chips to have any number of inputs and outputs.

Switch chip 116 is coupled to input signal lines 124 and 128 that originate from device boards 104 and 106 respectively. In addition, switch chip 116 is coupled to output signal lines 142 and 144. Signal line 142 is coupled to an input of switch chip 122 on switch board 114, while signal line 144 is coupled to an input of switch chip 118 on switch board 112.

Switch chip 118 has input signal lines 144 and 140. Signal line 144 is coupled to an output of switch chip 116, while signal line 140 is coupled to an output of switch chip 120 on switch board 114. Output signal lines 126 and 130 of switch chip 118 are coupled to device boards 104 and 106, respectively.

The couplings of switch chips 120 and 122 are symmetric to the couplings of switch chips 116 and 118 and will not be described further.

Switch chips 116, 118, 120, and 122 are coupled together such that any input signal line can connect to any output signal line or, in the case of a broadcast packet, to all of the output signal lines.

Switch Chips

Figure 2:
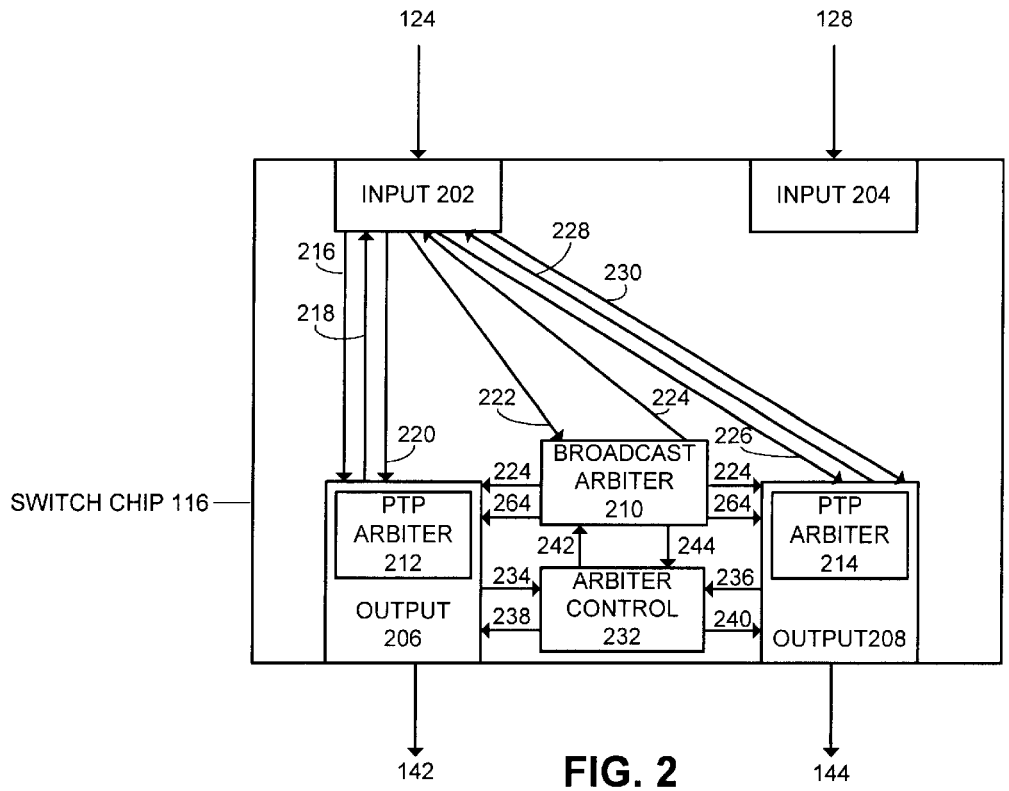
FIG. 2 illustrates the details of a switch chip in accordance with an embodiment of the present invention.

FIG. 2 illustrates representative switch chip 116 in accordance with an embodiment of the present invention. The other switch chips have the same configuration. Switch chip 116 comprises inputs 202 and 204, outputs 206 and 208, broadcast arbiter 210 and arbiter control 232.

Input 202 is coupled to external signal line 124 as illustrated previously and to internal signal lines 216, 218, 220, 222, 224, 226, 228, and 230. Point-to-point grant requests to output 206 are carried on signal line 216 and point-to-point grant requests to output 208 are carried on signal line 226. Input 202 receives point-to-point grants from outputs 206 and 208 on signal lines 218 and 228, respectively. Packet data from input 202 is coupled to output 206 on signal line 220 and to output 208 on signal line 230. Broadcast requests are coupled from input 202 to broadcast arbiter 210 on signal line 222 and broadcast grants on signal line 224 are returned from broadcast arbiter 210 to input 202. Broadcast grants on signal line 224 are also routed to outputs 206 and 208. These couplings will be described in conjunction with FIG. 4.

Signal lines 256, 258, 260, 262, 264, 266, 268, and 270 are coupled to input 204 but are not shown in the figure. Signal lines 256, 258, 260, 262, 264, 266, 268, and 270 perform the same functions for input 204 as signal lines 216, 218, 220, 222, 224, 226, 228, and 230, respectively, do for input 202. Signal line 264 is also routed to outputs 206 and 208 and serves the same function for outputs 206 and 208 as signal line 224 does.

Outputs 206 and 208 are coupled externally to signal lines 142 and 144 and internally to inputs 202 and 204 as described above. In addition, outputs 206 and 208 are coupled to arbiter control 232 to allow arbitration of point-to-point grant requests on signal lines 218, 228, 258, and 268.

During operation, output 206 sends requests for grants to arbiter control 232 on signal line 234 and receives a grant enable from arbiter control 232 on signal line 238. Output 208 sends requests for grants to arbiter control 232 on signal line 236 and receives a grant enable from arbiter control 232 on signal line 240.

Broadcast arbiter 210 receives broadcast requests on signal lines 222 and 262 from inputs 202 and 204, respectively, and returns broadcast grants to inputs 202 and 204 on signal lines 224 and 264 respectively. Broadcast arbiter 210 sends requests for grants to arbiter control 232 on signal line 244 and receives grant enable from arbiter control 232 on signal line 242.

The Input

Figure 3:
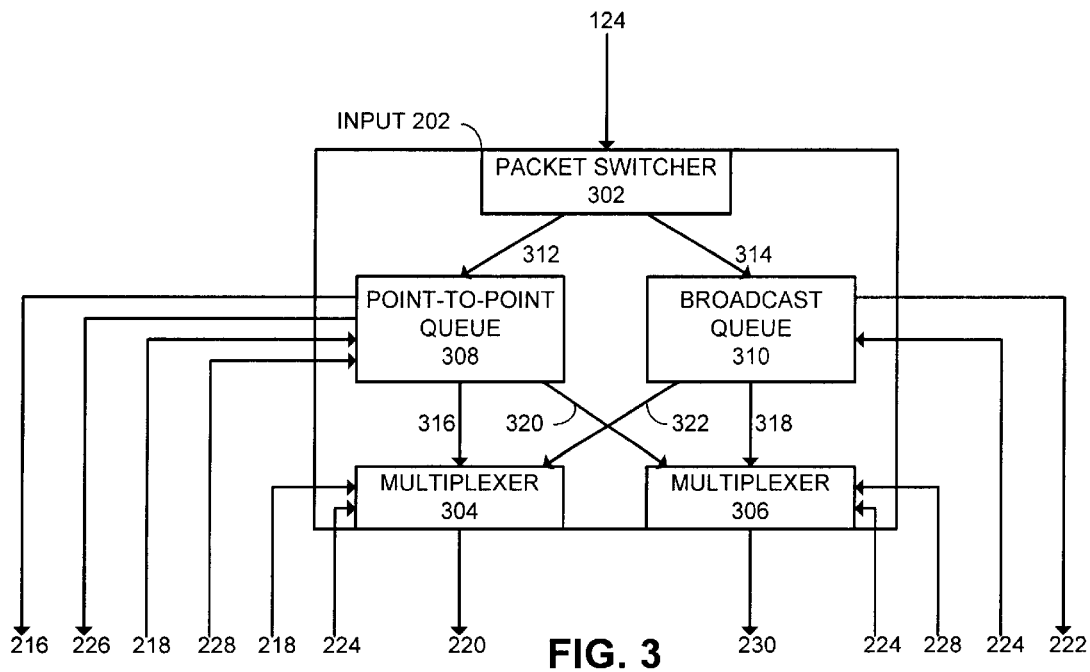
FIG. 3 illustrates the input section of a switch chip in accordance with an embodiment of the present invention.

FIG. 3 illustrates the input section 202 of switch chip 116 in accordance with an embodiment of the present invention. Packet switcher 302 routes incoming packets on external signal line 124 to point-to-point queue 308 on signal line 312 or broadcast queue 310 on signal line 314 depending on the routing information in the packet header.

For packets in point-to-point queue 308, point-to-point queue 308 determines whether a packet is destined for output 206 or output 208 and sends a point-to-point grant request to the addressed output on signal line 216 for output 206 or signal line 226 for output 208.

If the packet is destined for output 206, a-point-to-point grant is received on signal line 218. Note that signal line 218 is coupled to both point-to-point queue 308 and multiplexer 304. Upon receipt of the point-to-point grant on signal line 218, point-to-point queue 308 sends the packet to multiplexer 304 on signal line 316. Simultaneously, multiplexer 304 connects input signal line 316 to output signal line 220.

If the packet is destined for output 208, a point-to-point grant is received on signal line 228. Note that signal line 228 is coupled to both point-to-point queue 308 and multiplexer 306. Upon receipt of the point-to-point grant on signal line 228, point-to-point queue 308 sends the packet to multiplexer 306 on signal line 320. Simultaneously, multiplexer 306 connects input signal line 320 to output signal line 230.

For packets in broadcast queue 310, broadcast queue 310 sends a broadcast grant request to broadcast arbiter 210 on signal line 222. The broadcast grant is received from broadcast arbiter 210 on signal line 224. Note that signal line 224 is coupled to broadcast queue 310, output multiplexer 304, and output multiplexer 306. Upon receipt of the broadcast grant on signal line 224, broadcast queue 310 sends the packet to multiplexer 304 on signal line 322 and to multiplexer 306 on signal line 318. Simultaneously, multiplexer 304 connects input signal line 322 to output signal line 220 and multiplexer 306 connects input signal line 318 to output signal line 230.

The Output

Figure 4:
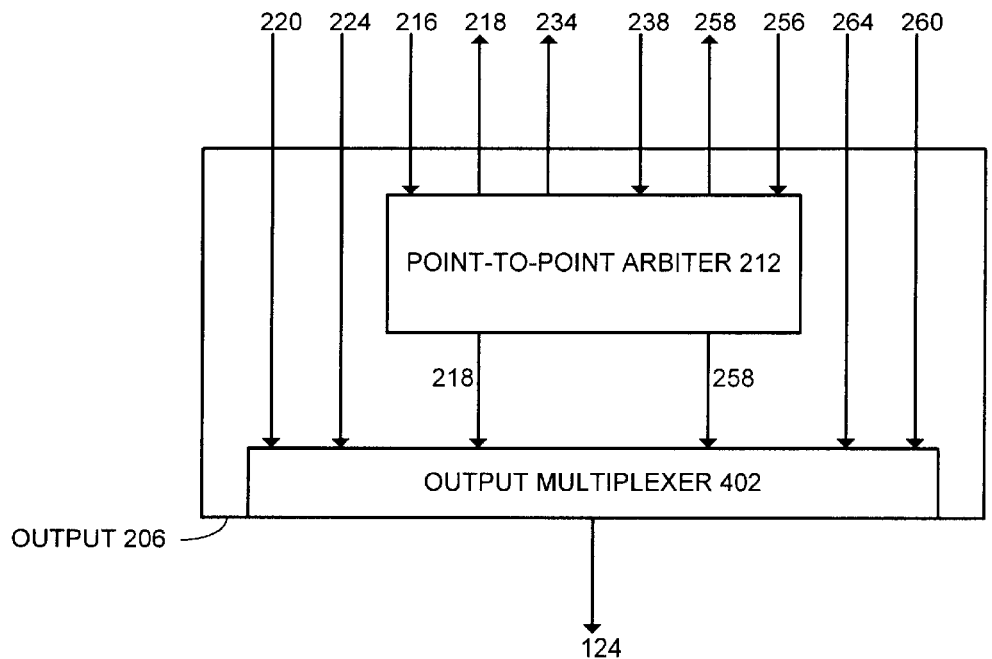
FIG. 4 illustrates the output section of a switch chip in accordance with an embodiment of the present invention.

FIG. 4 illustrates output 206 of switch chip 116 in accordance with an embodiment of the present invention. Point-to-point arbiter 212 receives point-to-point grant requests from input 202 on signal line 216 and from input 204 on signal line 256. In response to either point-to-point grant request, point-to-point arbiter 212 sends a point-to-point grant request to arbiter control 232 across signal line 234. Upon receipt of grant enable on signal line 238, point-to-point arbiter 212 sends a point-to-point grant to input 202 on signal line 218 or input 204 on signal line 258. In case of simultaneous requests from inputs 202 and 204, any fairness scheme can be used to select the input to receive the point-to-point grant. Note that signal lines 218 and 258 are additionally coupled to output multiplexer 402.

When the point-to-point grant is sent on signal line 218, multiplexer 402 connects signal line 220 to signal line 124. Likewise, when the point-to-point grant is sent on signal line 258, multiplexer 402 connects signal line 260 to signal line 124.

When broadcast arbiter 210 issues a broadcast grant on signal line 224, input 202 sends a packet on signal line 220. Simultaneously, the broadcast grant on signal line 224 connects signal line 220 to output signal line 124.

Similarly, when broadcast arbiter 210 issues a broadcast grant on signal line 264, input 204 sends a packet on signal line 260. Simultaneously, the broadcast grant on signal line 264 connects signal line 260 to output signal line 124.

Arbiter Control

Figure 5:
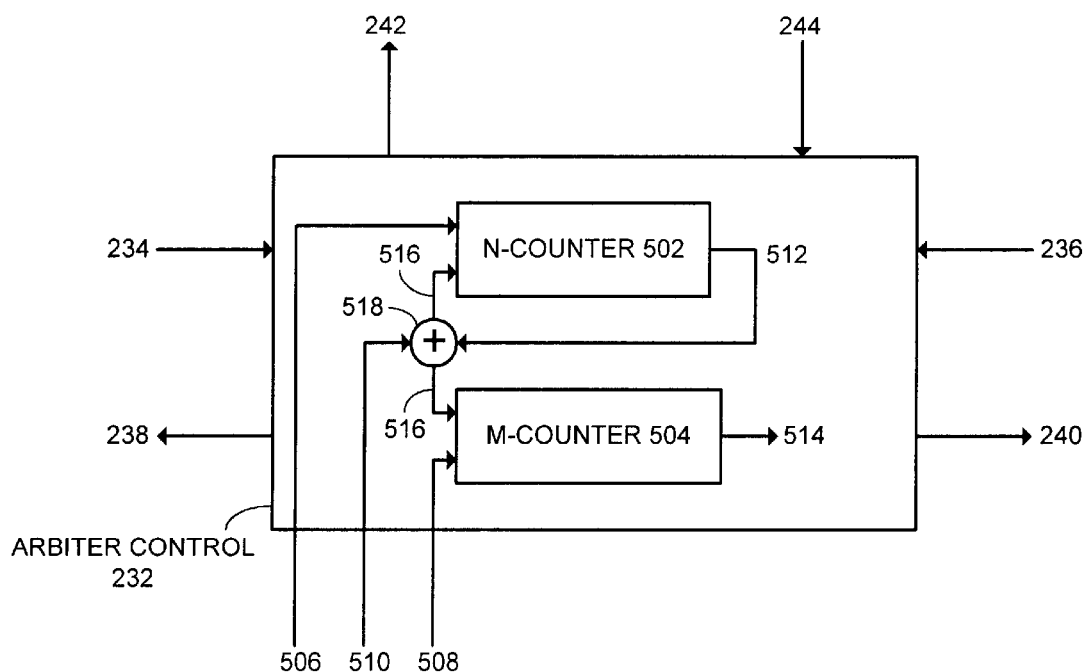
FIG. 5 illustrates the arbiter control section of a switch chip in accordance with an embodiment of the present invention.

FIG. 5 illustrates arbiter control 232 in accordance with an embodiment of the present invention. N-counter 502 receives a count of the number of packet slots on signal line 506. M counter 504 receives a count of the number of broadcast preferred packet slots on signal line 508. These counts may be determined statically prior to starting the system, or dynamically during system operation. Reset signal 516 loads these counts into n-counter 502 and m-counter 504. Both counters decrement after each slot time until they reach zero.

Upon reaching zero, n-counter 502 sets signal line 512. Similarly, upon reaching zero m-counter 504 sets signal line 514. N-counter 502 and m-counter 504 are each configured to stop decrementing when their respective count reaches zero. When signal line 514 is active, the state of the switch chip is point-to-point only. When signal line 514 inactive, the state of the switch chip is broadcast preferred.

OR-gate 518 receives an external reset on signal line 510. Note that all switch chips in computing system 102 receive the reset signal simultaneously so the switch chips can be synchronized. OR-gate 518 also receives a reset signal from n-counter 502 on signal line 512 when n-counter 502 reaches zero. OR-gate 518 passes either reset signal to n-counter 502 and m-counter 504 on signal line 516.

Arbiter control 232 receives a request for broadcast grant on signal line 244. If the state of signal line 514 is broadcast preferred, arbiter control 232 sends grant enable on signal line 242. When the state is point-to-point only, arbiter control 232 does not send grant enable on signal line 242 until the state of signal line 514 changes to broadcast preferred.

Arbiter control 232 receives requests for point-to-point grant on signal lines 234 and 236. If the state is point-to-point only, arbiter control 232 sends grant enable on signal lines 238 or 240 respectively. When the state is broadcast preferred, arbiter control 232 sends grant enable on signal lines 238 or 240 only if broadcast grant enable is not being sent on signal line 242. Note that it is possible for point-to-point grant enable to be on signal lines 238 and 240 simultaneously.

Issuing Grant Signals

Figure 6:
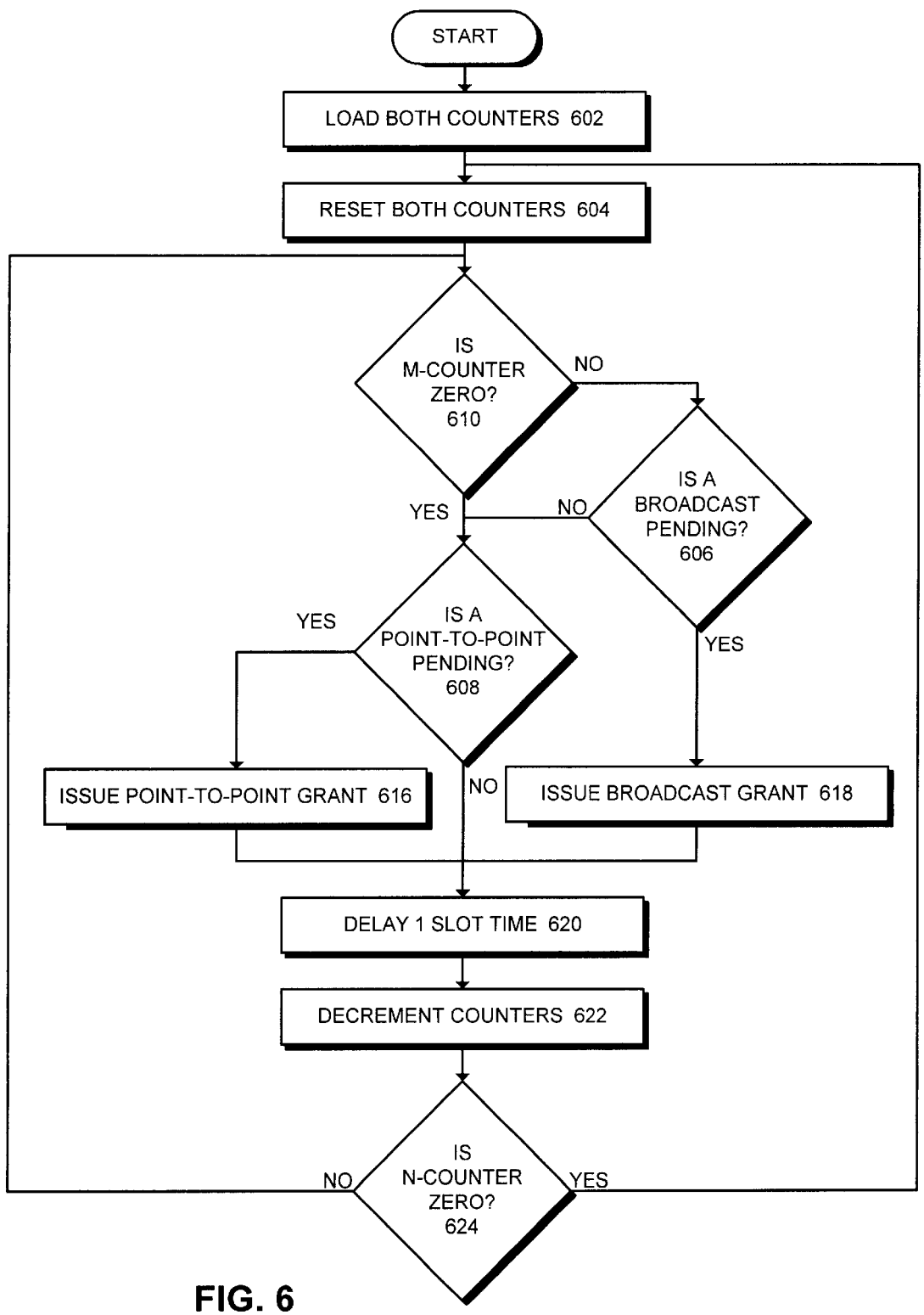
FIG. 6 is a flowchart illustrating the process of determining the state of the computing system and of issuing grants in accordance with an embodiment of the present invention.

FIG. 6 is a flowchart illustrating the process of determining the state of computing system 102 and issuing grants in accordance with an embodiment of the present invention. The system starts when n-counter 502 and m-counter 504 receive count values on signal lines 506 and 508 respectively (step 602). An external reset signal applied on signal line 510 passes through OR-gate 518 to become reset signal 516. Reset signal 516 sets the previously loaded values into n-counter 502 and m-counter 504 (step 604).

Arbiter control 232 determines if m-counter 504 is zero (step 610). Note that zero in m-counter 504 indicates point-to-point only. If m-counter 504 is not zero (step 610), arbiter control 232 determines if there is a broadcast request for grant on signal line 244 (step 606). If there is a broadcast request for grant on signal line 244 (step 606), arbiter control 232 issues broadcast grant on signal line 242 (step 618).

If m-counter 504 is zero (step 610), or if there is not a broadcast request for grant on signal line 244 (step 606), arbiter control 232 determines if there is a point-to-point request for grant on signal lines 234 and/or 236 (step 608). If there is a point-to-point request for grant on signal lines 234 and/or 236 (step 608), arbiter control 232 issues point-to-point grant on signal lines 238 and/or 240 respectively (step 616).

After a point-to-point grant has been issued (step 616), after a broadcast grant has been issued (step 618), or if there is not a point-to-point request for grant on signal lines 234 and/or 236 (step 608), arbiter control 232 delays the system for one slot time (step 620). Next, arbiter control 232 decrements n-counter 502, and if m-counter 504 is not zero, decrements m-counter 504 (step 622).

Arbiter control 232 then determines if n-counter 502 is zero (step 624). If n-counter 502 is zero (step 624), a reset signal applied on signal line 512 passes through OR-gate 518 to become reset signal 516. Reset signal 516 sets the loaded values into n-counter 502 and m-counter 504 (step 604). If n-counter 502 is not zero (step 624), control is returned to step 606 to start the next cycle.

Routing a Packet

Figure 7:
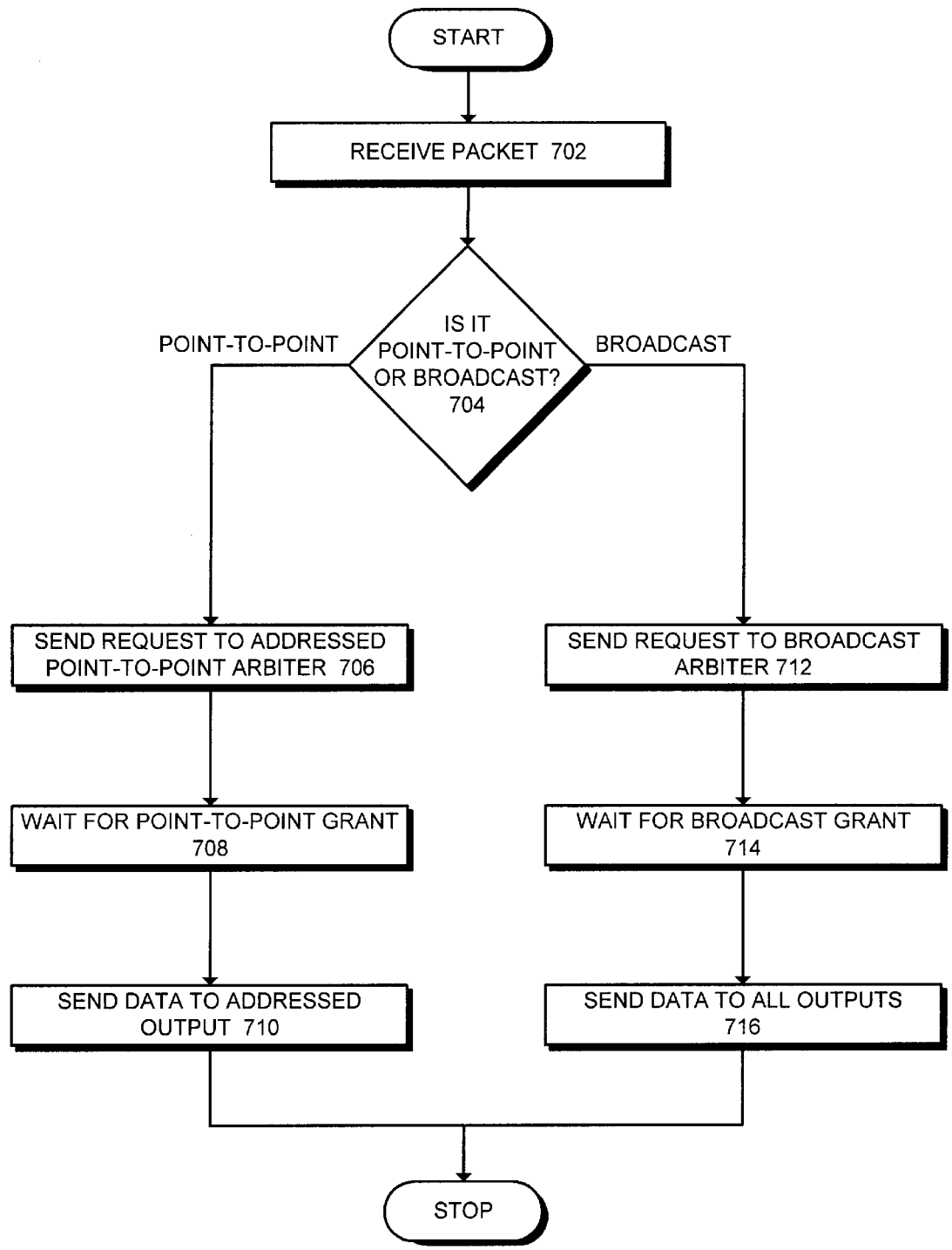
FIG. 7 is a flowchart illustrating the process of routing a packet in accordance with an embodiment of the present invention.

FIG. 7 is a flowchart illustrating the process of routing a packet through switch chip 116 in accordance with an embodiment of the present invention. The system starts when a packet is received at an input of switch chip 116 (step 702). Input 202 of switch chip 116 determines if the packet is a point-to-point packet or a broadcast packet (step 704).

If the received packet is a point-to-point packet (step 704), input 202 sends a request for a point-to-point grant to point-to-point arbiter 212 or 214 depending on the destination of the packet (step 706). Input 202 then waits for a point-to-point grant (step 708). After the point-to-point grant is received (step 708), the packet is sent to the destination output (step 710).

If the received packet is a broadcast packet (step 704), input 202 sends a request for a broadcast grant to broadcast arbiter 210 (step 712). Input 202 then waits for a broadcast grant (step 714). After the broadcast grant is received (step 714), the packet is sent to all outputs (step 716).

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that is configured to facilitate packet communication between a device of a computing system and one or more of a plurality of additional devices within the computing system, comprising:

a receiving mechanism that is configured to receive a packet from the device;

an inspecting mechanism that is configured to inspect a header of the packet to determine a type for the packet, wherein the type can be one of broadcast and point-to-point;

a determining mechanism that is configured to determine a state of the computing system, wherein the state is one of, broadcast preferred and point-to-point only, wherein the determining mechanism comprises:

an n-counter that is configured to count available packet slots, an m-counter that is configured to count broadcast preferred packet slots, and a combining mechanism that is configured to combine the n-counter and the m-counter to determine the state of the computing system;

a sending mechanism that is configured to send the packet to the plurality of additional devices if the type of the packet is broadcast and the state of the computing system is broadcast preferred;

wherein the sending mechanism is further configured to delay sending the packet until the state of the computing system changes to broadcast preferred if the type of the packet is broadcast and the state of the computing system is point-to-point only;

wherein the sending mechanism is further configured to delay sending the packet while broadcast packets are available to be sent if the type is point-to-point and the state of the computing system is broadcast preferred; and wherein the sending mechanism is further configured to send the packet to an addressed one of the plurality of additional devices if the type is point-to-point and the state of the computing system is point-to-point only.

2. The apparatus of claim 1, wherein the receiving mechanism comprises a plurality of input queues, an input queue being assigned to one of the plurality of additional devices of the computing system.

3. The apparatus of claim 1, wherein the inspecting mechanism is configured to inspect a routing prefix of the packet to determine if the packet is a broadcast packet or a point-to-point packet, and if the packet is point-to-point, to determine a destination for the packet.

4. The apparatus of claim 2, wherein the determining mechanism further comprises:

a broadcast arbiter that is configured to issue a broadcast grant to the input queue in response to a broadcast request;

a plurality of point-to-point arbiters, wherein a point-to-point arbiter is configured to issue a point-to-point grant to one of the plurality of input queues in response to a point-to-point request; and a plurality of output multiplexers, an output multiplexer being configured to route the packet from the input queue to a selected device, wherein the output multiplexer receives switching information from one of the broadcast arbiter and an associated point-to-point arbiter.

5. The apparatus of claim 4, wherein the n-counter is configured to be reset to the number of available packet slots upon receiving an external command or when the n-counter decrements to zero.

6. The apparatus of claim 4, wherein the m-counter is configured to be reset to a number of broadcast preferred slots upon receiving an external command or when the n-counter decrements to zero.

7. The apparatus of claim 6, wherein the m-counter is configured to decrement to zero and to hold at zero waiting for a reset command.

8. The apparatus of claim 4, wherein the combining mechanism is configured to combine the n-counter and m-counter to determine the state of the computing system;

wherein the state is broadcast preferred if both the n-counter and the m-counter are counting; and wherein the state is point-to-point only if the n-counter is counting and the m-counter is zero.

9. The apparatus of claim 4, wherein the broadcast arbiter receives broadcast requests from the plurality of input queues and provides a broadcast grant signal to a requesting input queue based on the state of the computing system and other grant signals.

10. The apparatus of claim 4, wherein the point-to-point arbiter receives point-to-point requests from the plurality of input queues and provides a point-to-point grant signal to a requesting input queue based on the state of the computing system and other grant signals.

11. The apparatus of claim 4, wherein the output multiplexer is configured to route the packet from a selected input queue from the plurality of input queues to the device that is coupled with the output multiplexer.

12. A computing system that is configured to facilitate packet communication between a device of the computing system and one or more of a plurality of additional devices of the computing system, comprising:

a central processing unit;

a memory;

an input/output device;

a receiving mechanism that is configured to receive a packet from the device;

an inspecting mechanism that is configured to inspect a header of the packet to determine a type for the packet, wherein the type can be one of broadcast and point-to-point;

a determining mechanism that is configured to determine a state of the computing system, wherein the state is one of broadcast preferred and point-to-point only, wherein the determining mechanism comprises:

an n-counter that is configured to count available packet slots, an m-counter that is configured to count broadcast preferred packet slots, and a combining mechanism that is configured to combine the n-counter and the m-counter to determine the state of the computing system;

a sending mechanism that is configured to send the packet to the plurality of additional devices if the type is broadcast and the state of the computing system is broadcast preferred;

wherein the sending mechanism is further configured to delay sending the packet until the state of the computing system changes to broadcast preferred if the type is broadcast and the state of the computing system is point-to-point only;

wherein the sending mechanism is further configured to delay sending the packet while broadcast packets are available to be sent if the type is point-to-point and the state of the computing system is broadcast preferred; and wherein the sending mechanism is further configured to send the packet to an addressed one of the plurality of additional devices if the type is point-to-point and the state of the computing system is point-to-point only.

13. A method for facilitating packet communication between a device of a computing system and one or more of a plurality of additional devices of the computing system, comprising:

receiving a packet from the device;

inspecting a header of the packet to determine a type for the packet, wherein the type can be one of broadcast and point-to-point;

determining a state of the computing system wherein determining the state of the computing system involves:

examining an n-counter that counts available packet slots, examining an m-counter that counts broadcast preferred packet slots, and combining the n-counter and the m-counter to determine the state of the computing system, wherein the state of the computing system is one of point-to-point only and broadcast preffered;

if the type is broadcast and the state of the computing system is point-to-point only, delaying sending the packet until the state of the computing system changes to broadcast preferred; and if the type is point-to-point and the state of the computing system is broadcast preferred, delaying sending the packet while broadcast packets are available to be sent.

14. The method of claim 13, wherein the packet additionally includes a routing prefix and data.

15. The method of claim 13, wherein the device includes one of:

a central processing unit;

an input/output device; and a memory.

16. The method of claim 14, wherein inspecting the header involves determining if the routing prefix indicates one of:

broadcast; and point-to-point.

17. The method of claim 13, wherein the state of the computing system is switched periodically between:

broadcast preferred; and point-to-point only.

18. The method of claim 16, wherein if the routing prefix indicates broadcast and the state of the computing system is broadcast preferred, the method further comprises sending the packet to the other devices.

19. The method of claim 16, wherein if the routing prefix indicates point-to-point and the state is point-to-point only, the method further comprises sending the packet to an addressed one of the other devices.

20. The method of claim 17, wherein the state of the computing system is switched periodically to achieve a substantially optional ratio of broadcast packets to point-to-point packets.

* * * * *